(12) United States Patent
Rydin et al.

(10) Patent No.: US 8,415,447 B2
(45) Date of Patent: Apr. 9, 2013

(54) POLYOLEFIN COATED STEEL PIPES

(75) Inventors: Cecilia Rydin, Oedsmal (SE); James McGoldrick, Marchtrenk (AT); Tony Lindstroem, Bleket (SE); Siegfried Liedauer, Wilhering (AT)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/478,480

(22) PCT Filed: May 21, 2002

(86) PCT No.: PCT/EP02/05547
§ 371 (c)(1),
(2), (4) Date: Feb. 25, 2004

(87) PCT Pub. No.: WO02/094922
PCT Pub. Date: Nov. 28, 2002

(65) Prior Publication Data
US 2005/0025922 A1    Feb. 3, 2005

(30) Foreign Application Priority Data

May 21, 2001 (EP) .................................... 01112369

(51) Int. Cl.
*C08G 64/00* (2006.01)
*C08G 63/02* (2006.01)

(52) U.S. Cl.
USPC .......................................................... 528/35

(58) Field of Classification Search .............. 428/38, 428/36.91, 36.5; 525/191; 524/543
See application file for complete search history.

(56) References Cited

U.S. PATENT DOCUMENTS

| | | | | |
|---|---|---|---|---|
| 4,606,953 A | * | 8/1986 | Suzuki et al. .................. | 138/143 |
| 5,310,584 A | * | 5/1994 | Jacoby et al. ..................... | 428/2 |
| 5,362,808 A | | 11/1994 | Brosius et al. | |
| 5,716,998 A | * | 2/1998 | Munakata et al. ............... | 521/58 |
| 5,824,714 A | * | 10/1998 | Broennum et al. ........... | 521/155 |

FOREIGN PATENT DOCUMENTS

| | | | |
|---|---|---|---|
| DE | 33 19 515 | | 11/1984 |
| DE | 297 22 949 | | 2/1998 |
| EP | 0 142 724 | | 5/1985 |
| EP | 0 177 961 | | 4/1986 |
| EP | 0 190 889 | | 8/1986 |
| EP | 0 277 514 | | 8/1988 |
| EP | 0 384 431 | | 8/1990 |
| EP | 0 450 342 | | 10/1991 |
| EP | 0 574 801 | | 12/1993 |
| EP | 0 574 804 | | 12/1993 |
| EP | 0 634 454 | | 1/1995 |
| EP | 0 678 527 | | 10/1995 |
| EP | 0 688 817 | | 12/1995 |
| EP | 0 714 923 | | 6/1996 |
| EP | 1 174 261 | | 1/2002 |
| JP | 60110717 A | * | 6/1985 |
| JP | 04 135844 | | 5/1992 |
| JP | 08 300561 | | 11/1996 |
| JP | 10 076601 | | 3/1998 |
| JP | 2000-044909 | | 2/2000 |
| WO | WO 99/24479 | * | 5/1999 |
| WO | WO-99 40151 | | 8/1999 |

* cited by examiner

*Primary Examiner* — Terressa Boykin
(74) *Attorney, Agent, or Firm* — Jordan and Hamburg LLP

(57) ABSTRACT

Polyolefin coated steel pipes with high dynamic fracture toughness of the coating of the steel pipes during installation handling and in service, consisting of a steel pipe core, optionally an intermediate foamed plastic material, and a polyolefin coating of β-nucleated propylene copolymers whereby a test polyolefin pipe fabricated from the β-nucleated propylene copolymer has a critical pressure of >25 bars and a dynamic fracture toughness >3.5 $MNm^{-3/2}$. The polyolefin coated steel pipes are suitable for off-shore transport of crude oil or gas products or district heating applications.

15 Claims, 1 Drawing Sheet

POLYOLEFIN COATED STEEL PIPES

FIELD OF THE INVENTION

Figure 1:
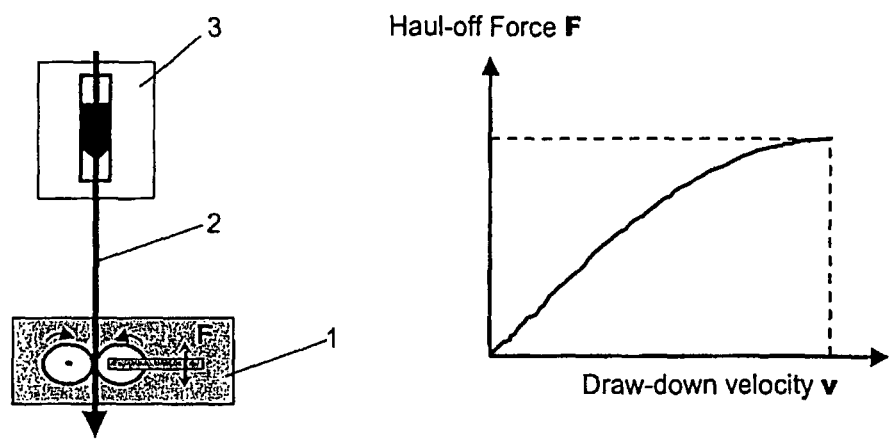

The invention relates to polyolefin coated steel pipes with high dynamic fracture toughness of the coating of the steel pipes during installation handling and in service consisting of a steel pipe core, optionally an intermediate foamed, filled or solid plastic material, and a polyolefin coating, as well as a process for producing them.

BACKGROUND OF THE INVENTION

Polyolefin coated steel pipes with a polyolefin coating consisting of linear low density polyethylene (JP 08,300, 561), blends of propylene polymers and α-olefin copolymer elastomers (JP 2000,44,909) or syndiotactic polypropylene (JP 08,300,562) are known. The disadvantage of these polyolefin steel coatings is the insufficient dynamic fracture toughness of test pipes fabricated from the coating material. A high dynamic fracture toughness is required for coated steel pipes in order to avoid cracking of the coating during installation handling and in service.

The term installation handling as used herein means any installation technique such as coiling and uncoiling of the ready made pipelines, welding and other jointing techniques and installation at the seabottom for off-shore intallations with specially designed ships, most often to a depth of several hundreds of meters, also to uncertain sea bottom conditions with risk of rock impingements etc. Installation handling of coated steel pipes, in particular for off-shore applications, involves tough conditions for the protective coating layer, including high stress, substantial elongation, surface damages, notches, impact events etc, both at low and high temperature conditions and also at high hydrostatic pressure. The coating layer is not only the layer protecting the pipeline as such from damages as mentioned, it is also doing so in a stage of high stress and/or at elevated temperatures and pressures, making the coating layer most sensitive for cracking, compare in particular the stresses induced during coiling and uncoiling. During the service life of the coated pipeline, the coating has to protect the pipeline from damages and induced stress and crack formations at conditions close to 0° C., high hydrostatic pressures where a small damage or notch in the coating could propagate into a large crack putting the pipeline as such at risk. With a high dynamic fracture toughness of the coating material the material will not crack during installation handling and in service.

OBJECT OF THE INVENTION

It is the object of the present invention to provide polyolefin coated steel pipes with high dynamic fracture toughness of the coating of the steel pipes during installation handling and in service.

BRIEF DESCRIPTION OF THE INVENTION

According to the present invention, this object is achieved by polyolefin coated steel pipes with dynamic fracture toughness of the coating of the steel pipes during installation handling and in service, consisting of a steel pipe core, optionally an intermediate foamed plastic material, and a polyolefin coating, wherein the polyolefin coating consists of β-nucleated propylene copolymers from 90.0 to 99.9 wt % of propylene and 0.1 to 10.0 wt % of α-olefins with 2 or 4 to 18 carbon atoms with melt indices of 0.1 to 8 g/10 min at 230° C./2.16 kg, whereby a test polyolefin pipe fabricated from the β-nucleated propylene copolymer has a critical pressure of >25 bars and a dynamic fracture toughness of >3.5 MNm$^{-3/2}$ in the hydrostatic small scale steady state (hydrostatic $S_4$) test at 3° C.

DETAILED DESCRIPTION OF THE INVENTION

The term installation handling as used herein means any installation technique such as coiling, uncoiling, welding and other jointing techniques.

β-nucleated propylene polymers are isotactic propylene polymers composed of chains in a $3_1$ helical conformation having an internal microstructure of β-form spherulites being composed of radial arrays of parallel stacked lamellae. This microstructure can be realized by the addition of β-nucleating agents to the melt and subsequent crystallization. The presence of the β-form can be detected through the use of wide angle X-ray diffraction (Moore, J., Polypropylene Handbook, p.134-135, Hanser Publishers Munich 1996).

According to an advantageous embodiment, the β-nucleated propylene copolymers of the polyolefin coating are β-nucleated propylene block copolymers having an IRτ ≧0.97. More preferably, the β-nucleated propylene block copolymers have an IRτ ≧0.98, a tensile modulus of ≧11100 MPa at +23° C. and a Charpy impact strength, notched, ≧6 kJ/m$^2$ at −20° C. It is even more preferable for the β-nucleated propylene block copolymers to have an IRτ of ≧0.985. The difference of 0.005 in IRτ, IRτ being a measure for isotacticity, encompasses a significant increase in mechanical polymer properties, especially in stiffness.

The IRτ of the propylene polymers is measured and calculated as described in EP 0 277 514 A2 on page 5 (column 7, line 53 to column 8, line 11).

The propylene copolymers for use as coating for steel pipes according to the present invention have melt indices of 0.1 to 8 g/10 min at 230° C./2.16 kg, preferably 0.2 to 5 g/10 min at 230° C./2.16 kg.

According to a further preferred embodiment the β-nucleated polypropylene block copolymers have a tensile modulus of preferably ≧1300 MPa and most preferably ≧1500 MPa at +23° C.

Charpy impact strength of the β-nucleated propylene copolymers is ≧6 kJ/m$^2$ at −20° C., preferably ≧9 kJ/m$^2$ at −20° C., most preferably ≧10 kJ/m$^2$ at −20° C. Charpy impact strength of up to at least 60 kJ/m$^2$ is possible for copolymers.

Dynamic fracture toughness calculated from the critical pressure in the hydrostatic small scale steady state ($S_4$) test of test pressure pipes is an important safety parameter for steel pipe polyolefin coating materials with high dynamic fracture toughness of the polyolefin coating of the coating of the steel pipes during installation handling and in service.

The method of determining the dynamic fracture toughness is disclosed in Plastics, Rubber and Composites Processing and Applications, Vol. 26, No.9, pp.387 ff.

The dynamic fracture toughness $K_D$ is calculated directly from the hydrostatic S4 test critical pressure $P_c$ at 3° C. according to following equation:

$$K_D = p_c (\pi D/7)^{1/2} \cdot (D^*2),$$

wherein $P_c$ is the critical pressure, D is the diameter of the test pipe and D* is D/t and t is the wall thickness of the test pipe.

Comparative values for critical pressure [bar] and dynamic fracture toughness [MNm$^{-3/2}$] for common steel coating materials are approximately 7.44/bar1.5 MNm$^{-3/2}$ for propylene-ethylene random copolymer. These materials are not suitable as polyolefin coating materials with high crack toughness of the coating of the steel pipes during coiling, uncoiling, installation handling and in service. For the propylene-ethylene random copolymers dynamic fracture toughness is insufficient for the proposed applications in steel pipe coatings.

According to a further embodiment, the β-nucleated propylene block copolymers of the polyolefin coating having an IRτ of the propylene homopolymer block of ≧0.98 are propylene copolymers obtained by polymerization with a Ziegler-Natta catalyst system comprising titanium-containing solid components, an organoalumina, magnesium or titanium compound as cocatalyst and an external donor according to the formula

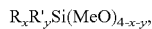

$$R_xR'_ySi(MeO)_{4-x-y},$$

wherein R and R' are identical or different and are branched or cyclic aliphatic or aromatic hydrocarbon residues, and y and x independently from each other are 0 or 1, provided that x+y are 1 or 2.

A preferred external donor in the Ziegler-Natta catalyst system for producing the β-nucleated propylene block copolymers of the polyolefin coating of the steel pipes is dicyclopentyldimethoxysilane.

According to an advantageous embodiment the β-nucleated propylene copolymers of the polyolefin coating contain 0,0001 to 2,0 wt %, based on the propylene copolymers used,
- dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, and/or
- diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, and/or
- amino acid derivative type diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, and/or
- quinacridone derivative compounds of the type quinacridone compounds, quinacridonequinone compounds, and/or dihydroquinacridone type compounds, and/or
- dicarboxylic acid salts of metals from group IIa of periodic system and/or mixtures of dicarboxylic acids and metals from group IIa of periodic system, and/or
- salts of metals from group IIa of periodic system and imido acids of the formula

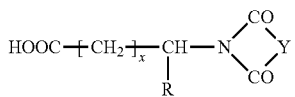

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_6$-cycloalkyl or $C_6$-$C_{12}$-aryl-substituted bivalent $C_6$-$C_{12}$-aromatic residues, as β-nucleating agent.

Examples of the dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, optionally contained in the β-nucleated propylene copolymers of the polyolefin coating of the steel pipe, are N,N'-di-$C_5$-$C_8$-cycloalkyl-2,6-naphthalene dicarboxamide compounds such as
N,N'-dicyclohexyl-2,6-naphthalene dicarboxamide and
N,N'-dicyclooctyl-2,6-naphthalene dicarboxamide,
N,N'-di-$C_5$-$C_8$-cycloalkyl-4,4-biphenyidicarboxamide compounds such as
N,N'-dicyclohexyl-4,4-biphenyidicarboxamide and
N,N'-dicyclopentyl-4,4-biphenyidicarboxamide,
N,N'-di-$C_5$-$C_8$-cycloalkyl-terephthalamide compounds such as
N,N'-dicyclohexylterephthalamide and
N,N'-dicyclopentylterephthalamide,
N,N'-di-$C_5$-$C_8$-cycloalkyl-1,4-cyclohexanedicarboxamide compounds such as
N,N'-dicyclohexyl-1,4-cyclohexanedicarboxamide and
N,N'-dicyclohexyl-1,4-cyclopentanedicarboxamide.

Examples of the diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, optionally contained in the β-nucleated propylene copolymers of the polyolefin coating of the steel pipe, are N,N'-$C_6$-$C_{12}$-arylene-bis-benzamide compounds such as
N,N'-p-phenylene-bis-benzamide and
N,N'-1,5-naphthalene-bis-benzamide,
N,N'-$C_5$-$C_8$-cycloalkyl-bis-benzamide compounds such as
N,N'-1,4-cyclopentane-bis-benzamide and
N,N'-1,4-cyclohexane-bis-benzamide.
N,N'-p-$C_6$-$C_{12}$-arylene-bis-$C_5$-$C_8$-cycloalkylcarboxamide compounds such as
N,N'-1,5-naphthalene-bis-cyclohexanecarboxamide and
N,N'-1,4-phenylene-bis-cyclohexanecarboxamide.
N,N'-$C_5$-$C_8$-cycloalkyl-bis-cyclohexanecarboxamide compounds such as
N,N'-1,4-cyclopentane-bis-cyclohexanecarboxamide and
N,N'-1,4-cyclohexane-bis-cyclohexanecarboxamide.

Examples of the aminoacid derivative type diamide compounds, optionally contained in the β-nucleated propylene copolymers of the polyolefin coating of the steel pipe, are N-phenyl-5-(N-benzoylamino)-pentaneamide and/or N-cyclohexyl-4-(N-cyclohexylcarbonylamino)-benzamide.

Examples of the quinacridone type compounds, optionally contained in the β-nucleated propylene copolymers of the polyolefin coating of the steel pipe, are quinacridone, dimethylquinacridone and/or dimethoxyquinacridone.

Examples of the quinacridonequinone type compounds, optionally contained in the 1-nucleated propylene copolymers of the polyolefin coating of the steel pipe, are quinacridonequinone, a mixed crystal of 5,12-dihydro(2,3b)acridine-7,14-dione with quino(2,3b)acridine-6,7,13,14-(5H,12H)-tetrone as disclosed in EP-B 0 177 961 and/or dimethoxyquinacridonequinone.

Examples of the dihydroquinacridone type compounds, optionally contained in the β-nucleated propylene copolymers of the polyolefin coating of the steel pipe, are dihydroquinacridone, dimethoxydihydroquinacridone and/or dibenzodihydroquinacridone.

Examples of the dicarboxylic acid salts of metals from group IIa of periodic system, optionally contained in the β-nucleated propylene copolymers of the polyolefin coating of the steel pipe, are pimelic acid calcium salt and/or suberic acid calcium salt.

Examples of salts of metals from group IIa of periodic system and imido acids of the formula

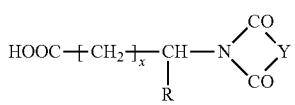

optionally contained in the β-nucleated propylene copolymers of the polyolefin coating of the steel pipe, are the calcium salts of phthaloylglycine, hexahydrophthaloylglycine, N-phthaloylalanine and/or N4-methylphthaloylglycine.

According to an advantageous feature of the present invention, the intermediate foamed plastic material, being optionally interposed between the steel pipe and the polyolefin coating, is a foamed propylene copolymer having strain hardening behaviour and a melt index of 1.5 to 10 g/10 min at 230° C./2.16 kg.

The propylene copolymer of the intermediate foamed plastic material, being optionally interposed between the steel pipe and the polyolefin coating, having a strain hardening behaviour can be produced by any number of processes, e.g. by treatment of propylene copolymers with thermal decomposing radical-forming agents and/or by treatment with ionizing radiation, where both treatments may optionally be accompanied or followed by a treatment with bi- or multifunctionally unsaturated monomers, e.g. butadiene, isoprene, dimethylbutadiene or divinylbenzene. Further processes may be suitable for the production of the propylene copolymers having a strain hardening behaviour, provided that the resulting propylene copolymers meet the characteristics of strain hardening behaviour.

Examples of said propylene copolymers of the intermediate foamed plastic material, being optionally interposed between the steel pipe and the polyolefin coating, having a strain hardening behaviour are, in particular:

polypropylenes modified by the reaction of polypropylenes with bismaleimido-compounds in the melt (EP-A-0 574 801; EP-A-0 574 804), polypropylenes modified by the treatment of polypropylenes with ionizing radiation in the solid phase (EP-A-0 190 889; EP-A-0 634 454), polypropylenes modified by the treatment of polypropylenes with peroxides in the solid phase (EP-A-0-384 431) or in the melt (EP-A-0-142724), polypropylenes modified by the treatment of polypropylenes with multifunctional, ethylenically unsaturated monomers under the action of ionizing radiation (EP-A-0 678 527)

polypropylenes modified by the treatment of polypropylenes with multifunctional, ethylenically unsaturated monomers in the presence of peroxides in the melt (EP-A-0 688 817; EP-A-0 450 342)

Figure 2:
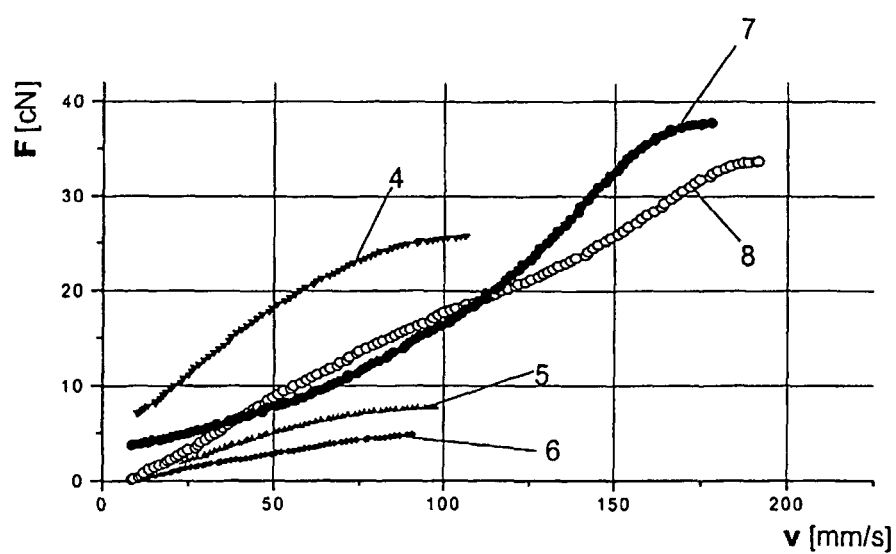

The strain hardening behaviour as used herein is defined according to FIGS. 1 and 2.

FIG. 1 shows a schematic representation of the experimental procedure which is used to determine strain hardening.

The strain hardening behaviour of polymers is analyzed by Rheotens apparatus 1 (product of Göttfert, Siemensstr. 2, 74711 Buchen, Germany) in which a melt strand 2 is elongated by drawing down with a defined acceleration. The haul-off force F in dependence of drawn down velocity v is recorded.

The Rheotens apparatus 1 is combined with an extruder/melt pump 3 for continuous feeding of the melt strand 2. The extrusion temperature is 200° C.; a capillary die with a diameter of 2 mm and a length of 6 mm is used and the acceleration of the melt strand 2 drawn down is 120 mm/sec².

The schematic diagram in FIG. 1 shows in an exemplary fashion the measured increase in haul-off force F (i.e. "melt strength") vs. the increase in draw-down velocity v (i.e. "drawability").

FIG. 2 shows the recorded curves of Rheotens measurements of polymer samples with and without strain hardening behaviour. The maximum points ($F_{max}$; $v_{max}$) at faiilure of the strand are characteristic for the strength and the drawability of the melt.

The common propylene polymers 4, 5, 6 with melt indices of 0.3, 2.0 and 3.0 g/10 min at 230° C./2.16 kg show a very low melt strength and low drawability. They have no strain hardening and therefore a problematic processability into extrusion foams. Modified propylene polymers 7 (melt index of the sample in the diagram is 2 to 3 g/10 min at 230° C./2.16 kg) or unmodified common LDPE 8 (melt index of the sample in the diagram is 0.7 g/10 min at 190° C./2.16 kg) show a completely different drawability vs. melt strength behaviour. With increasing the draw down velocity v the haul-off force F increases to a much higher level, compared to the unmodified common propylene polymers 4, 5, 6. The curve shape is characteristic for strain hardening.

"Propylene copolymers which have strain hardening behaviour" as used herein have enhanced melt strength with haul-off forces $F_{max}$>15 cN and enhanced drawability velocities $v_{max}$>150 mm/s.

According to a further preferred embodiment of the invention the test polyolefin pipe fabricated from the β-nucleated propylene copolymer has a critical pressure of >30 bars and a dynamic fracture toughness of >6.0 $MNm^{-3/2}$ in the hydrostatic small scale steady state (hydrostatic $S_4$) test at 3° C.

A further object of the present invention is a process for producing polyolefin coated steel pipes with high dynamic fracture toughness of the coating of the steel pipes during installation handling and in service, consisting of a steel pipe core, optionally an intermediate foamed plastic material, and a polyolefin coating fabricated by coating extruder/rotating steel pipe technology, ring-die pipe coating technology or injection molding technology, characterized in that the polyolefin coating consists of β-nucleated propylene copolymers from 90.0 to 99.9% by weight of propylene and 0.1 to 10.0% by weight of α-olefins with 2 or 4 to 18 carbon atoms with melt indices of 0.1 to 8 g/10 min at 230° C./2.16 kg, whereby a test polyolefin pipe fabricated from the β-nucleated propylene copolymer has a critical pressure of >25 bars and a dynamic fracture toughness of >3.5 $MNm^{-3/2}$ in the hydrostatic small scale steady state (hydrostatic S4) test at 3° C.

The inventive propylene block copolymers for the coating of steel pipes may contain usual auxiliary materials, such as 0.01 to 2.5 wt % stabilizers and/or 0.01 to 1 wt % processing aids, and/or 0.1 to 1 wt % antistatic agents and/or 0.2 to 3 wt % pigments, in each case based on the propylene copolymers used.

As stabilizers preferably mixtures of 0.01 to 0.6 wt % phenolic antioxidants, 0.01 to 0.6 wt % 3-arylbenzofuranones, 0.01 to 0.6 wt % processing stabilizers based on phosphites, 0.01 to 0.6 wt % high temperature stabilizers based on disulfides and thioethers and/or 0.01 to 0.8 wt % sterically hindered amines (HALS) are suitable.

For a good interlaminar adhesion between the steel pipe core, optionally the intermediate foamed plastic material, or the polyolefin coating it is advantageous to use epoxy resin coated steel pipes and to apply a compatibilizing layer between the epoxy resin coated steel pipe and the polyolefin layer, whereby the compatibilizing layer consists of propylene copolymers or propylene polymer graft copolymers both with chemical bound ethylenically unsaturated carbonic acids and/or carbonic acid anhydrides, particularly acrylic acid, methacrylic acid and/or maleic acid anhydride.

Conventional extruders for melting the propylene copolymers pursuant to the inventive process.

Producing the polyolefin coated steel pipes by coating extruder/rotating steel pipe technology, the preheated steel pipe, optionally coated with an epoxy resin, under rotation successively is melt coated by independent coating extruders having flat film dies for the unfoamed polyolefin cover layer and the optional layers of the compatibilizing agent and the foaming plastic material.

Producing the polyolefin coated steel pipes by crosshead die pipe coating technology, preferably a crosshead fed by extruders, for the outer unfoamed polyolefin cover layer and optional for the compatibilizing agent and the foaming plastic material, is used. The steel pipe is preferably coated with an epoxy resin layer and a compatibilizing layer on the epoxy resin layer. Preferably the steel pipe is preheated to a temperature ranging from 170 to 230° C., and the extruder feeding the ring shaped die of the crosshead in the polyolefin steel pipe coating line has a temperature profile ranging from 175 to 250° C. The optional foamed melt is brought first on the pipe, followed by the unfoamed outer layer of the β-nucleated propylene copolymer, subsequently the coated pipe is calibrated in the calibrating sleeve and cooled. Preferred are steel pipe diameters ranging from 50 to 500 mm.

Injection molding technology for producing the polyolefin coated steel pipes is used at field joint. The field joint coating machine consists of two parts. The injection molding machine melts the β-nucleated propylene copolymer in an extruder with adapter zones and then injects it into the mold, which is controlled by the mold locking part. In this second part the β-nucleated propylene copolymer is cooled down to solid state by oil or water. The preferred temperature profile of the extruder is from 200 to 250° C. and of the adapter zones from 230 to 240° C. The preferred mold temperature is from 80 to 100° C.

If optional an intermediate foamed plastic material is applied on the steel pipe, preferred polyolefin mixtures containing 1 to 12 wt %, based on the polyolefin mixture, of chemical blowing agents that split off gas, or hydrocarbons, halogenated hydrocarbons and/or gases as blowing agents are used, whereby the steel pipes are preheated to a temperature ranging from 170 to 230° C. and the foam coating extruder has a temperature profile ranging from 175 to 250° C.

Examples of suitable chemical blowing agents, that emit a gas, are sodium hydrogencarbonate, azodicarbonamide and/or cyanuric trihydrazide. Suitable hydrocarbons as blowing agents are readily volatile hydrocarbons, such as pentane, isopentane, propane and/or isobutane. Examples of suitable halogenated hydrocarbons are monofluorotrichloromethane and/or difluoromonochloromethane. Suitable gases as blowing agents are nitrogen, argon and/or carbon dioxide.

According to a feature of the present invention in the ring-die pipe coating technology for producing the polyolefin coated steel pipes a cone extruder is used, whereby the temperature of the melt of the nucleated propylene copolymer at the ring die is from 195 to 240° C. and the temperature of the preheated steel pipe is from 160 to 200° C.

Preferred applications of polyolefin coated steel pipes are the off-shore transport of crude oil or gas products or district heating applications.

In the application as polyolefin coated steel pipes for off-shore transport of crude oil from sea bottom to tankers, coated steel pipes with an intermediate foamed propylene copolymer material with foam densities of the foamed layer ranging from 600 to 800 kg/m$^3$ are preferred. In order to be able to pump crude oil coming from deposit in cold sea regions, the fluid has to be held sufficiently warm. By utilising the inventive coated steel pipes with an intermediate foamed propylene copolymer based insulation layer, it is possible to avoid extensive heat losses to the surrounding water and also to eliminate costly additional oil heating units along the pipe line. At water depths of 200 to 300 m the pressure is substantial and requires high mechanical stability of the foamed insulation layer. The foam layers of propylene copolymers having strain hardening behaviour have the outstanding balance between heat insulation efficiency and compression strength.

EXAMPLES

The following tests were made using injection molded test specimen prepared according to ISO 1873

Tensile modulus according to ISO 527 (cross head speed 1 mm/min) at +23° C.

Charpy impact strength, notched according to ISO 179/1eA

Rapid crack propagation test according to ISO 13477 performed under hydrostatic conditions Dynamic fracture toughness according to Plastics, Rubber and Composites Processing and Applications, Vol. 26, No. 9, pp.387 ff.

Compressive strength according to ASTM D 695-96, 5% compression

Example 1

1.1 Preparation of the β-Nucleated Propylene Copolymer

A mixture of 90 wt % of a propylene block copolymer, obtained by combined bulk and gas phase polymerization using a Ziegler-Natta catalyst system with dicyclopentyldimethoxysilane as external donor, having an ethylene content of 8.3 wt %, an IR$\tau$ of the propylene homopolymer block of 0.985 and a melt index of 0.30 g/10 min at 230° C./2.16 kg, 10 wt % of a master batch comprising 99 parts by weight of a propylene block copolymer having an ethylene content of 8.3% by weight, an IR$\tau$ of the propylene homopolymer block of 0.985 and a melt index of 0.30 g/10 min at 230° C./2.16 kg, and 1 part by weight of pimelic acid calcium salt, and 0.1 wt % calcium stearate, 0.1 wt % tetrakis [methylene(3,5-di-t-butylhydroxyhydrocinnamate)]methane and 0.1 wt % tris-(2,4-di-t-butylphenyl)phosphite, based on the sum of the propylene polymers used, is melted in a twin screw extruder with a temperature profile of 100/145/185/210/220/225/225/225/220/200/185° C., homogenized, discharged and pelletized.

The resulting propylene copolymer has a melt index of 0.32 g/10 min at 230° C./2.16 kg, a tensile modulus of 1290 MPa and a Charpy impact strength, using notched test specimens, of 39 kJ/m$^2$ at −20° C.

1.2 Manufacture of the Propylene Copolymer Test Pipe

For producing the propylene copolymer test pipe, the β-nucleated propylene copolymer of 1.1 is introduced in a single screw extruder (L/D=30, D=70 mm, temperature profile 200/210/220/220/220/220/200° C., 40 rpm), melted, extruded through a ring shaped die with a diameter of 110 mm, taken off over a vacuum calibrating sleeve as a pipe of a diameter of 110 mm and a wall thickness of 10 mm, and cooled in a 6 m water bath at +20° C., the taking off velocity being 0.3 m/min.

Rapid crack propagation test shows a critical pressure of 31 bar and a dynamic fracture toughness of 19.60 MNm$^{-3/2}$.

1.3 Manufacture of the Polyolefin Coated Steel Pipe

The pilot steel pipe coating line consists of a preheating unit, crosshead with two extruders, vacuum calibration sleeve, cooling unit and cutting unit.

For producing the intermediate foamed plastic layer, a propylene polymer compound comprising 30 wt % of a propylene homopolymer modified with 0.12% by weight of bound butadiene as determined by IR-spectroscopy and having strain hardening behaviour, a melt index of 0.45 g/10 min at 230° C./2.16 kg and a crystallization enthalpy of 91 J/g, 70 wt % of a propylene block copolymer having an ethylene content of 8.3% by weight, an IRτ of the propylene homopolymer block of 0.974, and a melt index of 0.30 g/10 min at 230° C./2.16 kg, and 0.1 wt % calcium stearate, 0.1 wt % tetrakis[methylene(3,5-di-t-butylhydroxyhydrocinnamate)]methane and 0.1 wt % tris-(2,4-di-t-butylphenyl)phosphite, based on the sum of the propylene polymers used, is dry blended with 2.2 wt %, based on the propylene compound, of a mixture of blowing agents based on bicarbonate and citric acid and supplied by means of a metering system to the feeding funnel of the first single screw extruder with a screw diameter of 90 mm, an L/D of 35 and a temperature profile of 200/230/240/230/230/23012301230/230/230° C. Initially, the mixture is melted and homogenized and subsequently the split off blowing gas is mixed intensively in the extruder and distributed homogeneously. After that, the melt is transferred by a melt pump onto the ring-shaped crosshead having a die temperature of 205° C.

The said crosshead is fed by a second single screw extruder with a screw diameter of 60 mm, a L/D of 35 and a temperature profile of 200/230/240/220/220/220/220/220/220/220° C. with the β-nucleated propylene copolymer of 1.1.

Inside of the crosshead a steel pipe (Ø150 mm), coated with a 25 μm epoxy resin layer and a 30 μm compatibilizing layer of a maleic acid anhydride grafted propylene polymer (0.20 wt % maleic acid anhydride), being preheated to a temperature of 190° C., is driven forward with a speed of 1.2 m/min. The crosshead is designed so that the foamed melt is added first onto the coated steel pipe, followed by the melt of the unfoamed propylene polymer for the outer layer, just before the pipe enters the vacuum calibration sleeve, which is cooled by water of +20° C.

From the polyolefin coated steel pipe test specimens of a length of 254 mm are machine cut. The polyolefin foam layer has a thickness of 50 mm and a density of 720 kg/m³. The unfoamed cover layer has a thickness of 8 mm. The compressive strength of coated steel pipe test specimens (ASTM D 695-96, 5% compression) being 19 MPa.

Example 2

2.1 Preparation of the β-Nucleated Propylene Copolymer

A mixture of 94 wt % of a propylene block copolymer, obtained by combined bulk and gas phase polymerization using a Ziegler-Natta catalyst system with dicyclopentyldimethoxysilane as external donor, having an ethylene content of 8.3 wt %, an IRτ of the propylene homopolymer block of 0.985, and a melt index of 0.30 g/10 min at 230° C./2.16 kg, 6 wt % of a master batch comprising 99.8 parts by weight of a propylene block copolymer having an ethylene content of 8.3 wt %, an IRτ of the propylene homopolymer block of 0.985, and a melt index of 0.30 g/10 min at 230° C./2.16 kg, and 0.2 parts by weight of a mixed crystal of 5,12-dihydro(2,3b)acridine-7,14-dione with quino(2,3b)acridine-6,7,13,14-(5H,12H)-tetrone, and 0.05 wt % calcium stearate, 0.1wt % tetrakis[methylene(3,5-di-t-butylhydroxyhydrocinnamate)]methane and 0.1wt % tris-(2,4-di-t-butylphenyl)-phosphite, based on the sum of the propylene polymers used, is melted in a twin screw extruder with a temperature profile of 100/145/190/215/225/230/230/215/205/190° C., homogenized, discharged and pelletized.

The resulting polypropylene polymer has a melt index of 0.3 g/10 min at 230° C./2.16 kg, a tensile modulus of 1450 MPa and a Charpy impact strength using notched test specimens at −20° C. of 21 kJ/m².

2.2 Manufacture of the Propylene Copolymer Test Pipe

For producing the propylene copolymer test pipe, the β-nucleated propylene copolymer of 2.1 is introduced in a single screw extruder (L/D=30, D=70 mm, temperature profile 200/210/225/225/225/225/205° C., 40 rpm), melted, extruded through a ring shaped die with a diameter of 110 mm, taken off over a vacuum calibrating sleeve as a pipe of a diameter of 110 mm and a wall thickness of 10 mm, and cooled in a 6 m water bath at 20° C., the taking off velocity being 0.35 m/min.

Rapid crack propagation test shows a critical pressure of 34 bar and a dynamic fracture toughness of 21.5 MNm$^{-3/2}$.

2.3 Manufacture of the Polyolefin Coated Steel Pipe

The pilot steel pipe coating line consists of a preheating unit, crosshead with two extruders, vacuum calibration sleeve, cooling unit and cutting unit.

For producing the intermediate foamed plastic layer, a propylene polymer compound comprising 20 wt % of a polypropylene copolymer having an ethylene content of 4.3 wt %, modified with 0.16% by weight of bound divinylbenzene, as determined by IR-spectroscopy, and having strain hardening behaviour and a melt index of 0.48 g/10 min at 230° C./2.16 kg, 80 wt % of a propylene block copolymer having an ethylene content of 8.3 wt %, an IRτ of 0.974 of the propylene block, and a melt index of 0.30 g/10 min at 230° C./2.16 kg, and 0.1 wt % calcium stearate, 0.1 wt % tetrakis [methylene(3,5-di-t-butylhydroxyhydrocinnamate)] methane and 0.1 wt % tris-(2,4-di-t-butylphenyl)phosphite, based on the sum of the propylene polymers used, is dry blended with 2.2 wt %, based on the propylene compound, of a mixture of blowing agents based on bicarbonate and citric acid and supplied by means of a metering system to the feeding funnel of the first single screw extruder with a screw diameter of 90 mm, an L/D of 35 and a temperature profile of 200/230/240/230/230/230/230/230/230° C.

Initially, the mixture is melted and homogenized and subsequently the split off blowing gas is mixed intensively in the extruder and distributed homogeneously. After that, the melt is transferred by a melt pump onto the ring-shaped crosshead having a die temperature of 205° C.

The said crosshead is fed by a second single screw extruder with a screw diameter of 60 mm, an L/D of 35 and a temperature profile of 200/230/240/220/220/220/220/220/220/220° C. with the β-nucleated propylene copolymer of 2.1.

Inside of the crosshead a steel pipe (Ø150 mm), coated with a 25 μm epoxy resin layer and a 30 μm compatibilizing layer of a maleic acid anhydride grafted propylene polymer (0.20% by weight of maleic acid anhydride), being preheated to a temperature of 190° C., is driven forward with a speed of 1.2 m/min. The crosshead is designed so that the foamed melt is added first onto the coated steel pipe, followed by the melt of the unfoamed propylene polymer for the outer layer, just before the pipe enters the vacuum calibration sleeve, which is cooled by water of +20° C.

From the polyolefin coated steel pipe test specimens of a length of 254 mm are machine cut. The polyolefin foam layer has a thickness of 55 mm and a density of 700 kg/m³. The unfoamed cover layer has a thickness of 8 mm. The compressive strength of coated steel pipe test specimens (ASTM D 695-96, 5% compression) being 17 MPa.

Example 3

3.1 Preparation of the β-Nucleated Propylene Copolymer

A mixture of 75 wt % of a propylene block copolymer obtained by combined bulk and gas phase polymerization using a Ziegler-Natta catalyst system with dicyclopentyldimethoxysilane as external donor, having an ethylene content of 8.3 wt %, an IRτ of the propylene homopolymer block of 0.985, and a melt index of 0.30 g/10 min at 230° C./2.16 kg, 25 wt % of a master batch comprising 99.5 parts by weight of a propylene block copolymer having an ethylene content of 8.3 wt %, an IRτ of the propylene homopolymer block of 0.985, and a melt index of 0.30 g/10 min at 230° C./2.16 kg, and 0.5 parts by weight of hexahydrophthaloylglycine calcium salt, and 0.1 wt % calcium stearate, 0.1 wt % tetrakismethylene(3,5-di-t-butylhydroxyhydrocinnamate)] methane and 0.1 wt % tris-(2,4-di-t-butylphenyl)phosphite, based on the sum of the propylene copolymers used, is melted in a twin screw extruder with a temperature profile of 100/145/185/210/220/225/225/200/185° C., homogenized, discharged and pelletized.

The resulting propylene copolymer has a melt index of 0.32 g/10 min at 230° C./2.16 kg, a tensile modulus of 1310 MPa and a Charpy impact strength using notched test specimens at −20° C. of 37 kJ/m².

3.2 Manufacture of the Propylene Copolymer Test Pipe

For producing the propylene copolymer test pipe, the β-nucleated propylene polymer of 3.1 is introduced in a single screw extruder (L/D=30, D=70 mm, temperature profile 200/210/220/220/220/220/200° C., 40 rpm), melted, extruded through a ring shaped die with a diameter of 110 mm, taken off over a vacuum calibrating sleeve as a pipe of a diameter of 110 mm and a wall thickness of 10 mm, and cooled in a 6 m water bath at +20° C., the taking off velocity being 0.3 m/min.

Rapid crack propagation test shows a critical pressure of 31 bar and a dynamic fracture toughness of 19.60 $MNm^{-3/2}$.

3.3 Manufacture of the Polyolefin Coated Steel Pipe

The pilot steel pipe coating line consists of a preheating unit, crosshead with extruder, vacuum calibration sleeve, cooling unit and cutting unit.

The crosshead is fed by a single screw extruder with a screw diameter of 60 mm, an L/D of 35 and a temperature profile of 200/230/240/220/220/220/220/220/220/220° C. with the β-nucleated propylene copolymer of 3.1.

Inside of the crosshead a steel pipe (Ø150 mm), coated with a 25 μm epoxy resin layer and a 30 μm compatibilizing layer of a maleic acid anhydride grafted propylene polymer (0,20 wt % maleic acid anhydride), being preheated to a temperature of 190° C., is driven forward with a speed of 1.2 m/min. The crosshead is designed so that the melt of the β-nucleated propylene copolymer is added onto the coated steel pipe, just before the pipe enters the vacuum calibration sleeve, which is cooled by water of +20° C.

The polyolefin coating has a thickness of 7.5 mm.

The invention claimed is:

1. Polyolefin coated steel pipe having high dynamic fracture toughness of the coating of the steel pipe during installation handling and in service, comprising a steel pipe core and a polyolefin coating, the polyolefin coating comprising β-nucleated propylene block copolymers of from 90.0 to 99.9 wt % of propylene and 0.1 to 10.0 wt % of α-olefins of 2 or 4 to 18 carbon atoms and having an IRτ of the propylene homopolymer block of ≧0.98 and melt indices of 0.1 to 8 g/10 min at 230° C/2.16 kg, a test polyolefin pipe fabricated from the β-nucleated propylene copolymer having a critical pressure of >25 bars and a dynamic fracture toughness of >3.5 $MNm^{-3/2}$.

2. Polyolefin coated steel pipe according to claim 1, wherein the β-nucleated propylene block copolymers have a tensile modulus of ≧1100 MPa and a Charpy impact strength, using notched test specimens at −20° C., of ≧6kJ/m².

3. Polyolefin coated steel pipe according to claim 2, wherein the β-nucleated propylene block copolymers having an IRτ of the propylene homopolymer block of ≧0.98 comprise propylene copolymers obtained by polymerization with a Ziegler-Natta catalyst system comprising titanium-containing solid components, an organoalumina, magnesium or titanium compound as cocatalyst and an external donor according to the formula

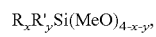

wherein R and R' are identical or different and are branched or cyclic aliphatic or aromatic hydrocarbon residues, and y and x independently from each other are 0 or 1, provided that x+y are 1 or 2.

4. Polyolefin coated steel pipe according to claim 3, wherein the external donor comprises dicyclopentyldimethoxysilane.

5. Polyolefin coated steel pipe according to one of claims 1 to 4, wherein the β-nucleated propylene copolymers contain 0.0001 to 2.0 wt %, based on the propylene copolymers, dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, and/or diamine derivative diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, and/or amino acid derivative diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic monoamines, and/or quinacridone compounds, quinacridonequinone compounds, and/or dihydroquinacridone compounds, and/or dicarboxylic acid salts of metals from group IIa of the periodic system and/or mixtures of dicarboxylic acids and metals from group IIa of the periodic system, and/or salts of metals from group IIa of periodic system and imido acids of the formula

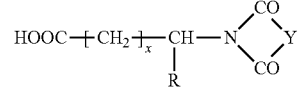

wherein x =1 to 4; R =H, —COOH, $C_1$-$C_{12}$-alkyl, $C_5$-$C_8$-cycloalkyl or $C_6$-$C_{12}$-aryl, and Y =$C_1$-$C_{12}$-alkyl, $C_5$-$C_8$-cycloalkyl or $C_6$-$C_{12}$-aryl—substituted bivalent $C_6$-$C_{12}$-aromatic residues, as β-nucleating agent.

6. Polyolefin coated steel pipe having high dynamic fracture toughness of the coating of the steel pipe during installation handling and in service, comprising:
a steel pipe core and a polyolefin coating, the polyolefin coating comprising β-nucleated propylene copolymers of from 90.0 to 99.9 wt % of propylene and 0.1 to 10.0 wt % of α-olefins of 2 or 4 to 18 carbon atoms and having melt indices of 0.1 to 8 g/10 min at 230° C./2.16 kg; and
an intermediate coating comprised of a foamed plastic, wherein
the foamed plastic comprises foamed propylene copolymer having strain hardening behavior and a melt index of 1.5 to 10 g/10 min at 230° C./2.16 kg; and
a test polyolefin pipe fabricated from the β-nucleated propylene copolymer having a critical pressure of >25 bars and a dynamic fracture toughness of >3.5 MNm$^{-3/2}$.

7. Polyolefin coated steel pipe of claim 1, further comprising an intermediate coating comprised of a foamed plastic.

8. Polyolefin coated steel pipe according to claim 1, further comprising an epoxy resin coating on said steel pipe core, said epoxy coating being between said steel pipe core and said polyolefin coating.

9. Polyolefin coated steel pipe according to claim 8, further comprising a compatibilizing layer between the epoxy resin coating and the polyolefin coating.

10. Polyolefin coated steel pipe according to claim 9, wherein said compatibilizing layer comprises propylene copolymers or propylene polymer graft copolymers both with chemically bound ethylenically unsaturated carbonic acids and/or carbonic acid anhydrides.

11. Polyolefin coated steel pipe according to claim 10, wherein said ethylenically unsaturated carbonic acids and/or carbonic acid anhydrides comprise acrylic acid, methacrylic acid, and/or maleic acid anhydride.

12. Polyolefin coated steel pipe according to claim 7, further comprising an epoxy resin coating on said steel pipe core, said epoxy coating being between said steel pipe core and said intermediate coating comprised of a foamed plastic.

13. Polyolefin coated steel pipe according to claim 7 made by a process comprising adding 1 to 12%, based on the amount of plastic, of a blowing agent.

14. A process for producing the polyolefin coated steel pipe according to claim 7, comprising adding 1 to 12%, based on the amount of plastic, of a blowing agent.

15. Polyolefin coated steel pipe according to claim 1, wherein the β-nucleated propylene copolymers contain 0.0001 to 2.0 wt %, based on the propylene copolymers,
dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, and/or
diamine derivative diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, and/or
amino acid derivative diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic monoamines, and/or
quinacridonequinone compounds and/or dihydroquinacridone compounds, and/or
dicarboxylic acid salts of metals from group IIa of the periodic system and/or
mixtures of dicarboxylic acids and metals from group IIa of the periodic system, and/or
salts of metals from group IIa of periodic system and imido acids of the formula
wherein x =1 to 4; R

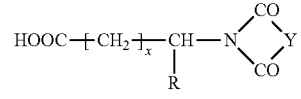

=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues,
as β-nucleating agent.

* * * * *